(12) United States Patent
Ford et al.

(10) Patent No.: US 11,216,775 B1
(45) Date of Patent: Jan. 4, 2022

(54) DIGITAL LUGGAGE SHIPPING SYSTEM AND METHOD

(71) Applicant: Brandon J. Ford, Edwards, CO (US)

(72) Inventors: Brandon J. Ford, Edwards, CO (US); Skyler Raphael Kruse-Asmussen, Omaha, NE (US); Robert Sebesta, Edwards, CO (US)

( * ) Notice: Subject to any disclaimer, the term of this patent is extended or adjusted under 35 U.S.C. 154(b) by 21 days.

(21) Appl. No.: 16/290,839

(22) Filed: Mar. 1, 2019

Related U.S. Application Data

(60) Provisional application No. 62/636,961, filed on Mar. 1, 2018.

(51) Int. Cl.
| | | |
|---|---|---|
| *G06Q 30/00* | (2012.01) | |
| *G06Q 10/08* | (2012.01) | |
| *G06Q 30/06* | (2012.01) | |

(52) U.S. Cl.
CPC ..... *G06Q 10/0838* (2013.01); *G06Q 30/0635* (2013.01)

(58) Field of Classification Search
CPC ...................................................... G06Q 30/00
See application file for complete search history.

(56) References Cited

U.S. PATENT DOCUMENTS

| | | | |
|---|---|---|---|
| 9,396,374 B2 | 7/2016 | Motley, III et al. | |
| 9,760,751 B2 | 9/2017 | Reh et al. | |
| 9,846,854 B1* | 12/2017 | Lee ...................... | G06Q 10/083 |
| 10,226,108 B2* | 3/2019 | Tsui .................... | B32B 37/1284 |
| 10,657,486 B1* | 5/2020 | Wolter ............... | G06Q 10/0833 |
| 2005/0218218 A1* | 10/2005 | Koster .................... | G09F 3/204 |
| | | | 235/383 |
| 2013/0241712 A1 | 9/2013 | Motley, III et al. | |

(Continued)

FOREIGN PATENT DOCUMENTS

| | | | | |
|---|---|---|---|---|
| CN | 103946872 A | * | 7/2014 | ....... G06K 19/07749 |

OTHER PUBLICATIONS

Neit, "Neit: World's first smart, collapsible hard case luggage", Jebiga.com, dated Feb. 26, 2016. (Year: 2016).*

(Continued)

*Primary Examiner* — Mark A Fadok
(74) *Attorney, Agent, or Firm* — Polson Intellectual Property Law, PC; Margaret Polson; Christopher Sylvain

(57) ABSTRACT

An on-demand shared luggage system and method comprising collapsible luggage assets or pieces of luggage. Each luggage asset has a reprogrammable label display configured to display shipping label data for a customer order. A central processing system receives an incoming customer order to use one or more luggage assets. The central processing system determines the specific luggage asset, carrier, and route to fulfill a customer order within the customer's requested parameters. The collapsed luggage asset assigned to the customer order is then delivered to a customer receiving location by a receiving location delivery date, expanded for packing customer belongings, and then delivered to a customer destination location by a destination location delivery date. Upon completion of the customer order, the luggage asset may be immediately assigned to a new customer order, loaded with new shipping label data, and delivered directly to a new customer receiving address, as determined by the central processing system.

16 Claims, 11 Drawing Sheets

(56) References Cited

U.S. PATENT DOCUMENTS

| | | | |
|---|---|---|---|
| 2014/0291405 A1 | 10/2014 | Harkes | |
| 2015/0320165 A1* | 11/2015 | Chi Yueh Chen ... | A45C 7/0054 190/18 A |
| 2017/0079398 A1 | 3/2017 | Reh et al. | |
| 2017/0103292 A1 | 4/2017 | Reh et al. | |

OTHER PUBLICATIONS rentluggage.com, web.archive.org/web/20171105153354/https://www.rentluggage.com/, dated Nov. 5, 2017. (Year: 2017).*

Biaggi, "Biaggi creator Stephen Hersh leapt into "shark tank" and won", biaggi.com blog, cira 2014. (Year: 2014).*

Luggagedirect, "3 space saving collasable, foldable luggage solutions", Luggagedirect.com.au, dated Mar. 24, 2015 (Year: 2015).*

* cited by examiner

DIGITAL LUGGAGE SHIPPING SYSTEM AND METHOD

RELATED APPLICATIONS

This application claims priority to U.S. provisional application No. 62/636,961 filed Mar. 1, 2018, which is hereby incorporated by reference for all purposes herein.

BACKGROUND

In air travel, travelers often bring luggage with them on their flight. Sometimes travelers will check bags with the airline for stowage during flight and then pick up the checked bags upon arrival at their final destination. This process takes time in checking and picking up luggage at baggage claim, risks the loss of luggage or damage to luggage contents from misplacement and mishandling, often requires the payment of additional fees depending on the airline, generally increases traveling hassle in transporting luggage to and from the airport, and requires security screening which may also increase time and hassle or even result in the bags being rejected. For smaller luggage, the traveler may typically elect to personally carry the bag onto the aircraft. However, this process also creates hassle in toting the luggage to and from the airport, as well as through the airport and during the embarking and disembarking of the aircraft. Again, the luggage must pass security protocols and the available space on the aircraft is often limited, which may add to the time and hassle of traveling.

In shipping, a package is typically brought to a carrier drop off location and then shipped by the carrier to a second location. The shipping price charged by the carrier is generally determined by size and/or weight. Carriers and on-demand delivery service providers are increasingly offering the ability to choose a scheduled pick up and location, as well as a specific delivery time or window, and providing the ability for customers to purchase and prepare shipping labels remotely without needing to go into a carrier drop off location. Further, large commercial carriers generally have substantial infrastructure and logistics systems in place for efficiently tracking packages in route and providing real time updates on delivery schedules. Packages, luggage or other personal shipping containers generally have a fixed or substantially fixed volume and are only transported between two locations, or sometimes between two locations and then back to the original location as in the case of, for example, travelers' skis or golf clubs for vacation.

The foregoing examples of the related art and limitations therewith are intended to be illustrative and not exclusive. Other limitations of the related art will become apparent to those of skill in the art upon a reading of the specification and a study of the drawings.

SUMMARY

In view of the foregoing, the present disclosure relates to an on-demand shared system and method for efficient and economically-viable transport of reusable packages or luggage through shipping carriers. The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

BRIEF DESCRIPTION OF THE DRAWINGS

The present disclosure is described hereafter based on illustrated embodiments with reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

A system according to the present disclosure may comprise a central processor or processing system in communication with a piece of luggage. In certain embodiments, the system further comprises one or more peripheral devices, such as a smart phone, which provides the communicative link between the central processor and the piece of luggage. In other embodiments, the central processor may be in direct communication with the piece of luggage. The central processor may comprise one or more remote or local servers or computers running an application or program; the central processor referring to the central system architecture (hardware, code, data set) necessary to carry out a method according to the present disclosure and not necessarily a single device, albeit the central processor may be provided by a single device in some embodiments. The central processor may track the location of pieces of luggage in the system, interface and execute requests and responses with other applications or systems (e.g., carrier, on-demand delivery, hotel, customer, etc.), monitor logistics and progress of luggage during transit, and determine subsequent steps for pieces of luggage using request inputs and luggage location and itinerary data to optimize efficiency as described below. Any suitable network connection or telecommunication technology may be used to communicatively connect the central processor to the piece of luggage, or the peripheral device to the central processor and the piece of luggage, for the transmission of information therebetween, depending on the embodiment (see FIG. 5).

As mentioned above, the one or more peripheral devices are in communication with the central processor and the piece of luggage. For example, the peripheral device may be the customer's smartphone, tablet, computer, etc. which communicates over a wired or wireless network with the central processor to send and receive requests and responses. Other peripheral devices or terminals linked into the system may belong to hotels, carriers, or on-demand delivery services (e.g., tech-based service providers). APIs may provide for the connectivity and sharing of information and data across various peripheral device systems via the central processor.

Figure 1:
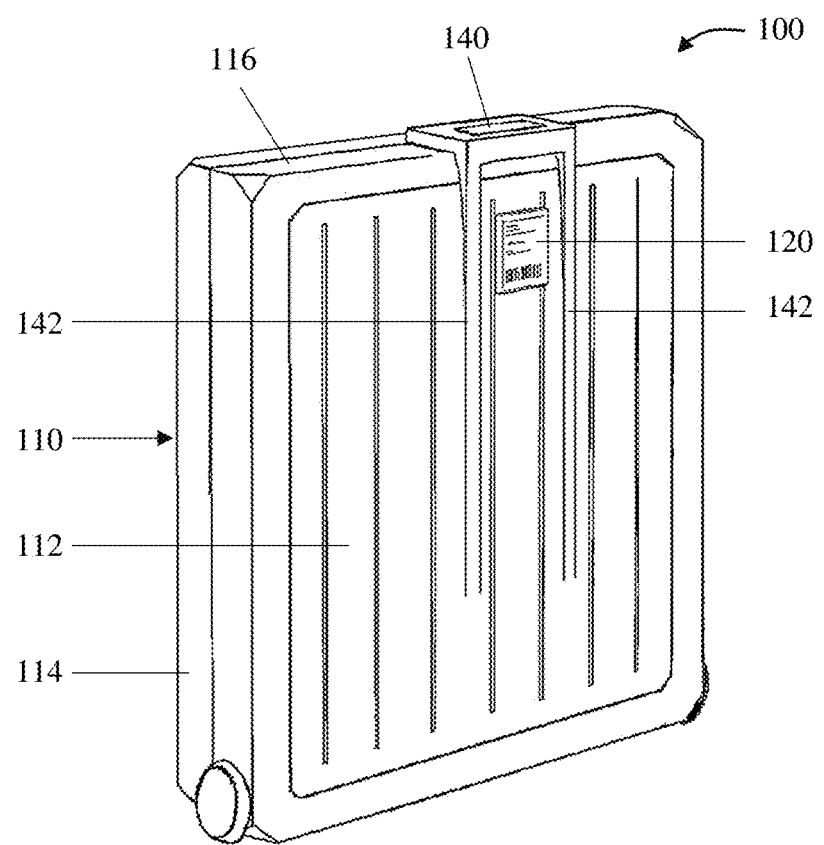
FIG. 1 is a front perspective view of a piece of luggage according to the present disclosure in a collapsed configuration.
Figure 2:
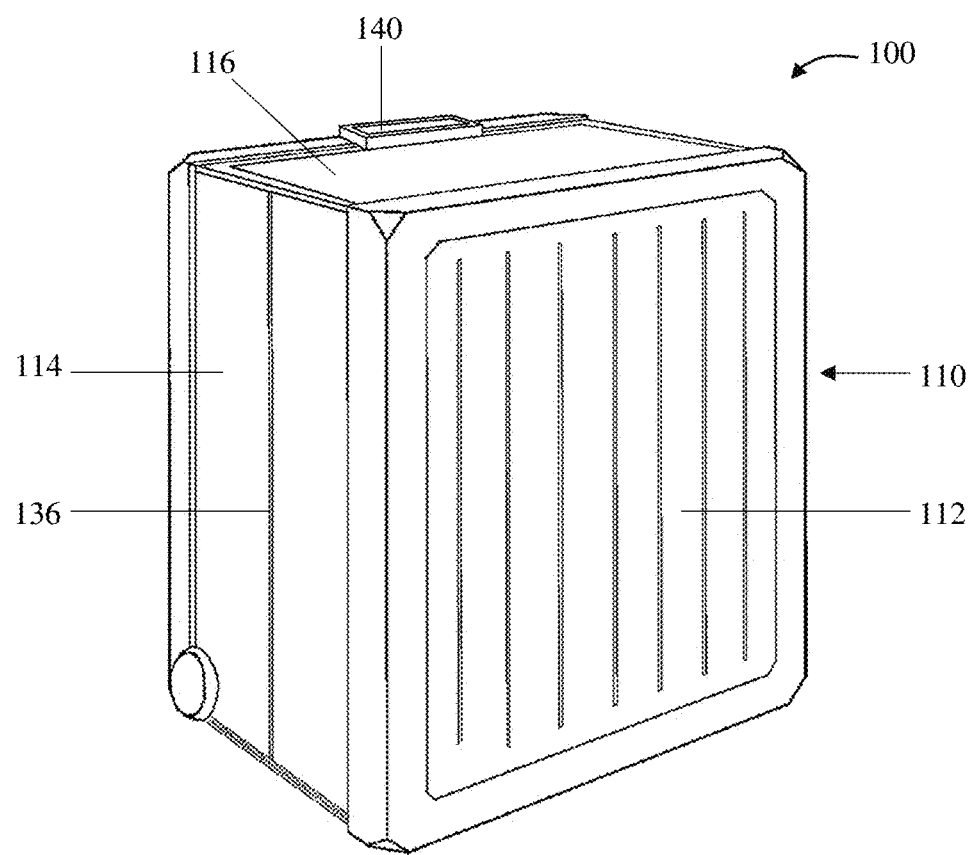
FIG. 2 is a back perspective view of the piece of luggage of FIG. 1 in an expanded configuration.

Referring to FIGS. 1 and 2, luggage 100 comprises a body 110 having an electronic display device. The electronic display device has a display 120 configured to display digital shipping information. The electronic display device may have a processor and a receiver. The processor may be a microcontroller, single integrated circuit, ASIC or any other suitable processing technology for processing data signals received by the receiver, and translating the data into shipping information to be displayed by the display and controlling the operation of the display. In some embodiments, the electronic display device may further have a transmitter for transmitting data signals generated by the processor of the electronic display device to the peripheral device or central processor. Other electronic components may include GPS chipset and antennae, cellular network interface, etc.

The body 110 of the piece of luggage 100 is collapsible and may be adjusted between an expanded configuration (see FIG. 2) and a collapsed configuration (see FIG. 1). The body 110 comprises two opposing panels 112 separated by four sides of the body, the four sides including two longitudinal sides 114 and two lateral sides 116 of the body. In the expanded configuration, the opposing panels 112 of the body are separated by a greater distance than in the collapsed configuration, thereby increasing the interior volume of the piece of luggage 100 available for stowing contents therein. On the other hand, the collapsed configuration occupies a smaller overall volume than the expanded configuration. This is significant since carrier shipping rates are typically determined by the size of the package being shipped, and therefore a direct economic benefit can be realized when the luggage 100 is shipped in its collapsed configuration compared to its expanded configuration.

Figure 3:
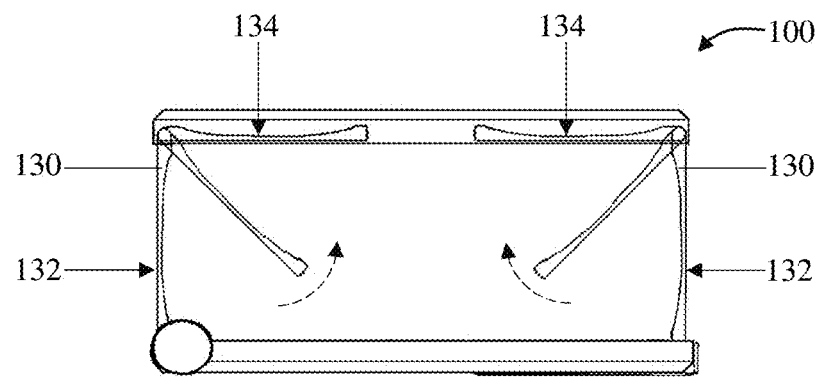
FIG. 3 is a side view of the piece of luggage of FIGS. 1 and 2, with the longitudinal sides thereof omitted to show various positions of the lateral side panels in switching between the collapsed and expanded configurations.
Figure 4:
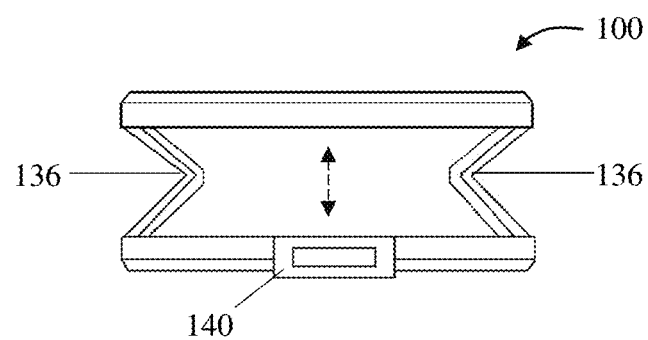
FIG. 4 is a top view of the piece of luggage of FIGS. 1 and 2, with the lateral sides thereof omitted to show the inward folding of the longitudinal sides in switching between the collapsed and expanded configurations.

As seen in FIG. 3, each of the lateral sides 116 of the body 110 has a panel 130 which can pivot between a first position 132 and a second position 134. In the first position 132, the panels 130 extend between the two opposing panels 112 and form the extension of the lateral sides 116 of the body in the expanded configuration. In the second position 134, the panels 130 are folded inward and attach to the interior surface of one of the panels 112 in the collapsed position. The longitudinal sides 114 of the body may likewise be folded inward in the collapsed configuration (see FIG. 1) or fully extended in the expanded configuration (see FIG. 2). For this purpose, the longitudinal sides 114 may have a fold line 136 (see FIG. 4) along which the sides 114 are configured to bend inwards toward the center of the body 110 in changing between the expanded and collapsed configurations, or vice versa. The opposing panels 112 can be coupled or otherwise secured together for transport in the collapsed configuration, so that the piece of luggage 100 does not unintentionally open into the expanded configuration.

In the depicted embodiment of FIGS. 1-4, the largest surfaces of the luggage 100 are formed by the opposing panels 112 of the body 110. The display 120 of the electronic display device may be provided on one of the opposing panels 112 of the body 110 of the piece of luggage 100, since the structural arrangement of the opposing panels 112 does not change between the expanded/collapsed configurations and since some carriers require or prefer that shipping labels be located on such surface.

In some embodiments, the luggage body 110 may not include outward projecting handles, wheels or other structures which may cause the piece of luggage 100 to become snagged during shipping. Moreover, some carriers may not accept packages with extruding handles, or otherwise not place such packages on automated conveyors which may increase costs and/or shipping times. In the depicted embodiment of FIGS. 1-4, the piece of luggage 100 has a retractable handle 140 that may be stored in a wall of the body 110 during shipping. The display 120 is positioned in between the two handle extension rod tracks 142 in the surface of the body panel 112, which provides additional protection for the display 120. However, it should be appreciated that any particular embodiment of the luggage body is preferably adapted to conform with the standardizations of the particular carrier system being used. For example, in the case of robotic automation requiring certain dimensions or attachment securement components (including extruding structures), the body of the piece of luggage and the location of the digital display thereon (and information displayed on the display) may be readily modified to conform with these requirements according to the present disclosure.

Figure 5:
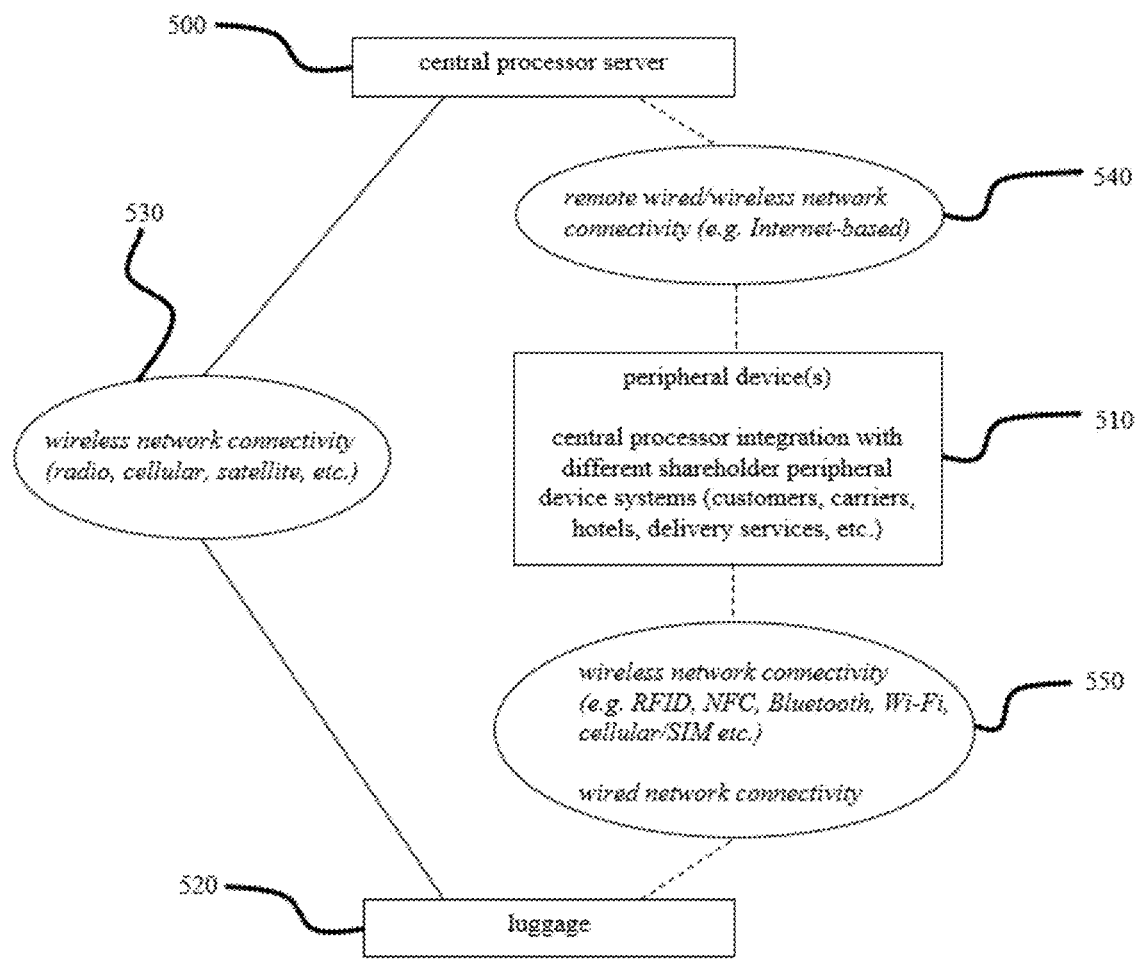
FIG. 5 shows a schematic diagram for a system network according to the present disclosure, with the solid line representing a direct communicative link between a central processor and a piece of luggage and the dashed line representing an indirect communicative link between a central processor and a piece of luggage via a peripheral device.

The display of the piece of luggage is configured to display a digital label containing shipping information, such as the origination and destination addresses and a barcode for processing by the carrier. Referring now to FIG. 5, the digital label containing shipping information displayed on the piece of luggage 520 may be switched directly by the central processor 500 according to back-end application control or by a peripheral device 510 via user input. The display could be a so-called currentless display, meaning an electrical current is only required to modify the information displayed on the display, for which purpose a battery may be provided in the luggage. As discussed above, the receiver is configured to receive a data signal and the transmitter is configured to transmit a data signal. Data signals may include incoming requests for current luggage location information, outgoing current luggage location information, and incoming digital shipping label information. A variety of data transmission methods and protocols may be used to implement the exchange of information between the piece of luggage and the central processor and/or peripheral device. For example, the network connection 530 between the central processor 500 and luggage asset 520 may use wireless network connectivity (e.g. radio, cellular, satellite, etc.). The network connection 540 between the central processor 500 and the peripheral device(s) 510 may use remote wired network connectivity or wireless network connectivity (e.g. Internet-based). The network connection 550 between the peripheral device(s) 510 and the luggage asset 520 may use wired network connectivity or wireless network connectivity (e.g. RFID, NFC, Bluetooth, Wi-Fi, cellular/SIM, etc.).

According to an embodiment method executed by the above-described system, shipping request from an external source is received and processed by the central processor. For example, a customer may input an order over a network to which the central processor is connected, such as over the Internet through a website or software application. The request may include a variety of identifying information (e.g., name, address, etc.) and shipping data pertaining to shipping dates, times and package requirements for a first location. The central processor may then select a piece of luggage according to the present disclosure to be sent to the first location and track the piece of luggage. For instance, the central processor may determine the most efficient luggage asset in the system to use for the order. For example, the optimal piece of luggage may be the closest asset in the system by distance to the first location. However, other data metrics may also be analyzed, including, but not limited to, time constraints, weather, real-time carrier information and availability, etc. The central processor may also consider other orders received by the system, since the most efficient luggage asset for a single order may not necessarily be the most efficient option for the system when two or more orders are considered.

When the specific piece of luggage to fulfill the order is determined, the central processor or a handler peripheral device may activate the display of said luggage to show a digital shipping label for the first location, and request processing of the luggage in agreement with the specific date and time requests by the user. The central processor may remain in communication with the piece of luggage during transport to the first location to track its current location and progress, either directly (e.g., GPS link with luggage) or indirectly (for example, via API requests and responses with carrier logistical systems). When the piece of luggage arrives at the first location, the central processor may output a notification to the requesting user and automatically update the digital label of the piece of luggage for shipping to a second location, or request the user to input such information. In other embodiments, the central processor may monitor the piece of luggage and recognize when a user has changed the digital label of the display, such as by inputting shipping information into a peripheral device in communication with the piece of luggage. The central processor may then update the status of the piece of luggage and automatically request pick-up by a carrier for delivery to a second location, as indicated by the digital shipping label displayed on the luggage display. Alternatively, the central processor may request pick-up by a carrier at a requested time by the user at the first location. In this way, the system may also be configured to interface and exchange requests with a carrier system or on-demand delivery system (for delivery to a carrier). The central processor may confirm when the piece of luggage has been picked up for delivery to the second location, either by tracking the location or movement of the luggage or by confirming with the carrier that the packaged has been picked up. Again, the central processor may track and provide real time notifications between the first and second location.

Once the piece of luggage arrives at the second location, the central processor may again update the status of the piece of luggage. If the piece of luggage is already allocated for another leg of shipping per the original user request, the central processor may periodically monitor the location of the luggage for security reasons or simply wait until the piece of luggage is ready for said next leg of transport. If the user is done with the piece of luggage after unpacking at the second location, the central processor may then schedule the piece of luggage for return to a dispatch center of the system for a subsequent request. Alternatively, the piece of luggage may immediately be assigned or activated to fulfill another user request, with a carrier being requested to pick up the piece of luggage from the second location by the system. The central processor may use the location of the user request to optimize the shipping time and expense in selecting a piece of luggage of the system to fulfill the request, by analyzing the current locations of the available luggage with the new location requested as described above. In this way, two legs of shipping (back to the dispatch center and then to a new user location) may be efficiently substituted by one leg of shipping. Further, the piece of luggage may be shipped in its collapsed configuration, thereby additionally reducing the shipping costs. In particularly high traffic locations according to data analysis by the system, such as popular hotel resorts, the central processor may determine that the most efficient option is to keep the piece of luggage at the current location for a period of time rather than sending out to fulfill another user request or returning the luggage to a dispatch center. The central processor may communicate with shareholder service industry systems for input in making this determination.

From an end-user perspective, a customer will order a piece of luggage for delivery to a first location. For example, the first location could be the customer's house. The piece of luggage is shipped to the first location in the collapsed configuration to save on shipping costs. The customer may then switch the luggage into its expanded configuration and pack the volume of the luggage as desired. The piece of luggage is then shipped to a second location selected by the user. For example, the second location could be a hotel for vacation. The customer could deposit the piece of luggage at a carrier drop-off location for shipping. Alternatively, the carrier or another partner (e.g. on-demand delivery service) may be scheduled to come to the first location to pick up the piece of luggage. For instance, the pick-up time may be selected by the user through the system according to the present disclosure (e.g. input from the customer's peripheral device relayed to the carrier), or the system may automatically schedule a pick-up time upon confirmation that the user is done with packing or after a set period of time elapses at the first location. Once the piece of luggage arrives at the second location, the contents of the piece of luggage may then be unpacked by the user. If no longer needed upon arrival at the second location, the empty piece of luggage may then be shipped in the collapsed configuration back to a storage center to be used for a subsequent order, or directly to another customer to fulfill a new order. In other cases, the piece of luggage may remain at the second location until it is needed by that customer or another customer for another leg of shipping, for example, if the user is on vacation and will be shipping the piece of luggage back home or to another destination, at which point the piece of luggage is shipped as above before being returned or forwarded to a new location in the collapsed configuration. In cases of extended stays at the second location, the piece of luggage may be returned or forwarded to a new location to fulfill another order rather than stay at the second location, and a new piece of luggage supplied to the customer closer to his or her departure date, thereby reducing the amount of dead or down time for that original piece of luggage.

Figure 6:
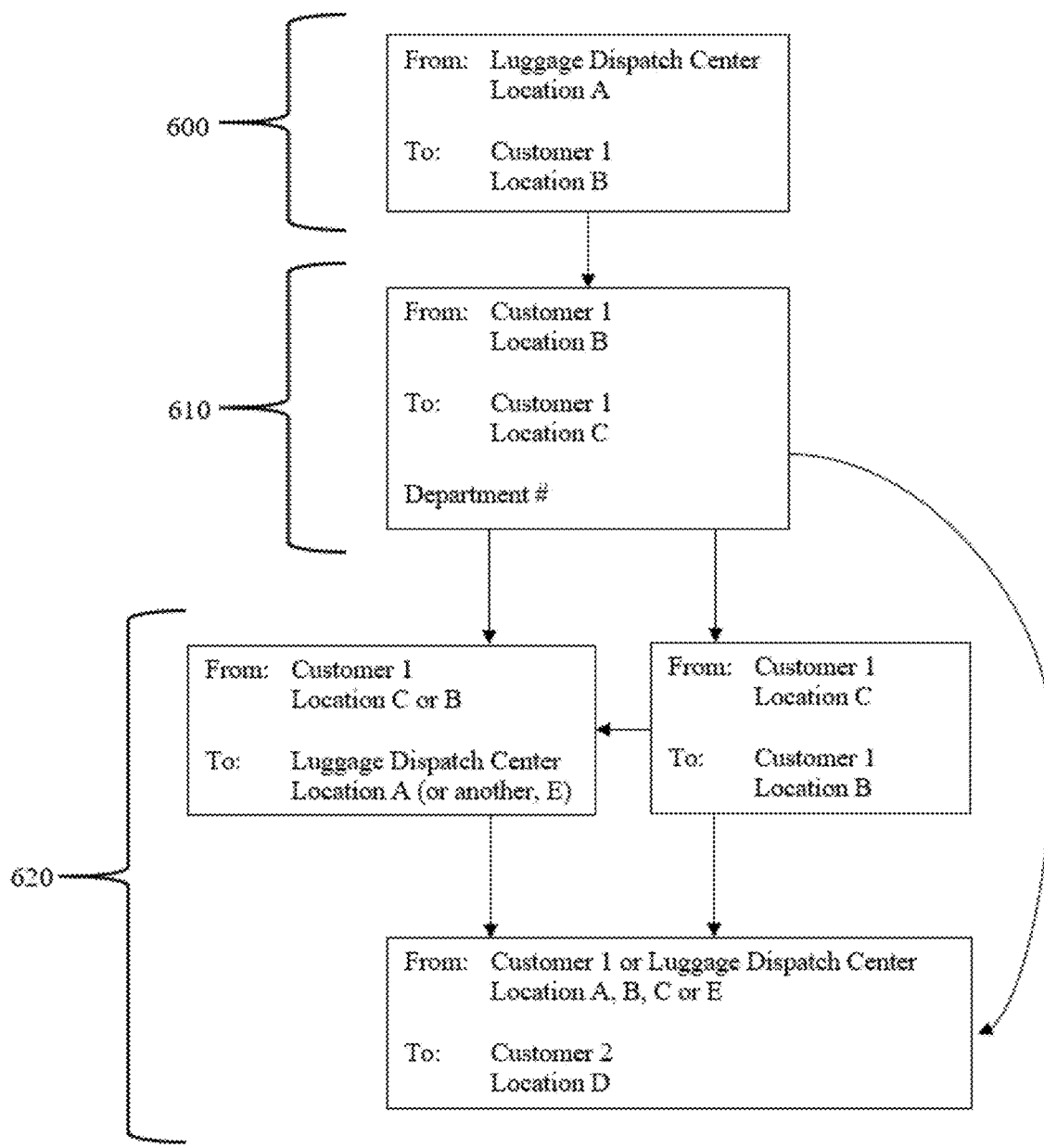
FIG. 6 shows a schematic flowchart for shipping label information of a piece of luggage at different legs of shipping.

FIG. 6 further illustrates a possible method according to the present disclosure. The boxes are schematic representations of the display of the digital display device of the piece of luggage from each leg of shipping between destinations; although not shown, bar codes will generally be included on the digital shipping label for carrier processing. For the first leg 600, the luggage is shipped from a system dispatch center (Location A) to a first customer (Location B). For the second leg 610, the luggage is shipped by the first customer from Location B to a new location (Location C). It should be appreciated that the information relating to the "Customer 1" label in the diagram does not necessarily correspond to the identity of the first customer; the first customer may also indicate a different recipient at the next location or authorize additional recipients besides herself. It should also be appreciated that the shipping information for the second leg 610 may optionally include a department or other order number, which may correspond to information input by the customer for the receiving location. For example, if the piece of luggage was delivered to a hotel at Location C, the customer may instruct the hotel to deliver the luggage to a room or keep the luggage at reception. In the third leg 620, the piece of luggage may be shipped from Location C either: (1) back to a system dispatch center, such as Location A or another more-efficient center determined by the central processor; (2) to a new location, Location D, to fulfill a different order for a second customer; or (3) back to Location B if, for example, the first customer was on a short stay at a hotel and needs to return the shipped property home. For this third option of the third leg 620, after the luggage arrives at Location B and is no longer needed by the first customer, the piece of luggage may then be directed according to either the first option or second option. Therefore, the luggage may not need to be returned to a system service center until a system shareholder (e.g., customer, carrier, etc.) reports an issue with the piece of luggage, at which point it will be directly returned for repair or to be decommissioned as necessary.

Figure 7:
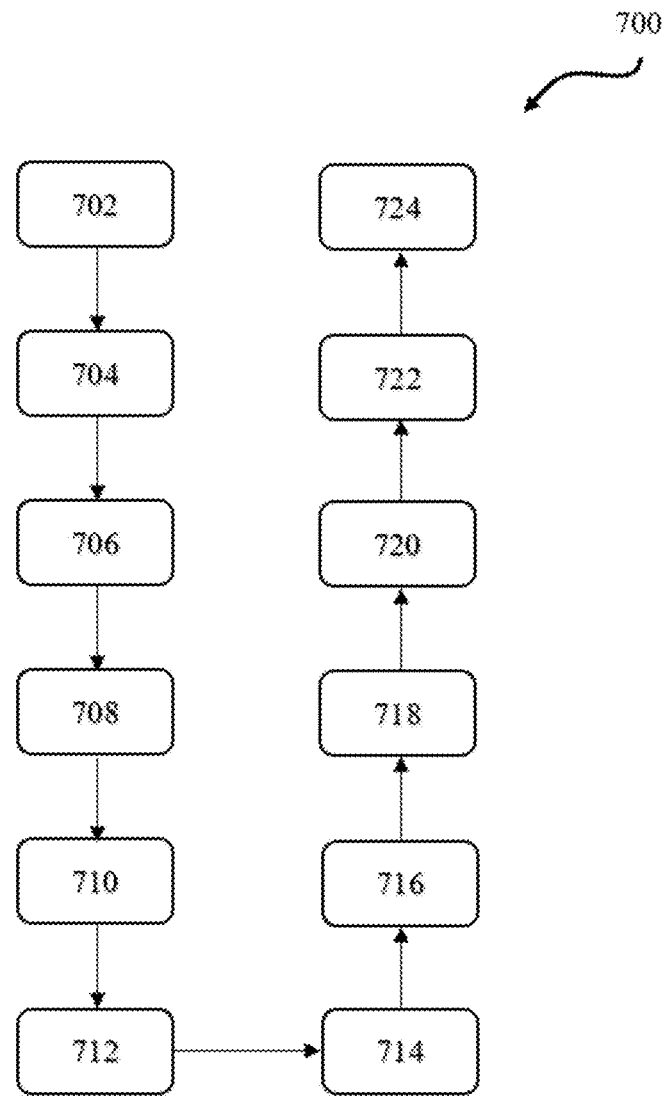
FIG. 7 shows a schematic flowchart for an on-demand shared luggage method according to the present disclosure.

FIG. 7 depicts a flowchart for an embodiment of a method 700 according to the present disclosure. In a first step 702, the central processing system receives a customer order to deliver a piece of luggage to a first location address by a first receiving date, to a second location address by a second location delivery date. The customer order may be made online through a website, using a smartphone app, or via a phone call by the customer to a customer service agent, for example. If the customer is a new user, the data collected may include general information as well as specific order information. If the customer is already in the database (e.g. the customer has previously created an account and used the service), the data collected may just include information for the specific order if no changes to general information are requested. For example, general customer information collected may include the customer's name, email, phone number, and payment details (e.g. credit card name, number, billing address, etc.). For example, specific order information may include the quantity and types of luggage assets requested (e.g. multiple pieces of luggage, larger pieces of luggage for shipping certain items, etc.), the receiving location address where the customer wants to receive the luggage asset, the receiving location date on which the customer wants to receive the luggage asset at the receiving location address (optionally, the customer may also indicate a preferred time or timeframe), the destination location address where the customer wants to send the luggage asset, and the destination location date on which the customer wants to receive the luggage asset at the destination location address (optionally, the customer may also indicate a preferred time or timeframe), as well as the same information for any additional shipping legs (e.g. if the customer plans to ship the luggage asset from the destination location back to the receiving location, or to a new location, at a future date). The customer's requirements for order fulfillment comprise order parameters. In a second step 704, the central processing system determines the order parameters from the received customer order. The order parameters correspond to the requested order fulfillment details, for example, the receiving location address/date and the destination location address/date.

In a third step 706, the central processing system determines which luggage asset from the system inventory of luggage assets will be used to fulfill the customer order, and how the customer order will be fulfilled. The selected luggage asset may be a luggage asset with no current order assignment (e.g. at a dispatch or storage center location, at a partner business location such as a hotel, etc.). Alternatively, the selected luggage asset may be a luggage asset that is currently assigned to or servicing another customer order, but which will be available to fulfill the subject customer order according to the order request parameters (deliverable to the receiving location address by the receiving location date). Any combination thereof may be used to fulfill a customer order requesting multiple luggage assets. The location from which a selected luggage asset is shipped to the receiving location address, whether it be a dispatch facility or other location (e.g. hotel, another customer's residence, etc.), is referred to as the asset's origination location, with the address of the origination location being the origination location address. The origination location address is not necessarily the location that the luggage asset is located when selected to fulfill the customer order, for example, where the luggage asset is currently in transit in completing a previous customer order. The central processing system identifies, by referencing at least luggage asset location/availability data, which luggage asset(s) in system inventory are capable of fulfilling the customer order in accordance with the order parameters. The central processing system's determination for a given customer order may be based on any number of data inputs, including, but not necessarily limited to: availability of luggage assets (e.g. whether a luggage asset is or will be available to fulfill the customer order); customer receiving location and date; distance between the origination location and receiving location addresses; competing customer order data; geographic distribution data of system inventory (e.g. whether certain areas have excess or not enough luggage assets based on past, actual and/or projected activity data); shipping carrier rates and availability data; route availability and performance data; seasonal delay data; real-time and/or historical weather data (see description below in reference to FIG. 8 for further details).

In a fourth step 708, the central processing system, as a result of this analysis, creates shipping label data for the customer order to transport the assigned luggage asset from the luggage asset's origination location address to the customer's receiving location address. The shipping label data comprises at least the information to be displayed on the digital label display of the luggage asset. This includes any information, text, bar codes, formats, etc. specific to the selected shipping carrier. In a fifth step 710, the shipping label data is transferred from the central processing system to the luggage asset assigned to the customer order, and the luggage asset receives the shipping label data from the central processing system. The programmable label display of the luggage asset may begin displaying the received shipping label data at this point. In some embodiments, the luggage asset may then reply to the central processing system with a status confirmation, for example, that it has received the shipping label data, its current location, and/or that it is ready for pickup. In such embodiments, if a status confirmation is received from the luggage asset, the central processing system continues to the next step. If no status confirmation is received, the central processing system may then select another luggage asset to fulfill the customer order and repeat the process.

In a sixth step 712, the central processing system creates a shipping carrier order for the luggage asset from the generated shipping label data and requests the selected shipping carrier fulfill the shipping carrier order. If using a third-party shipping carrier, the central processing system creates a shipping carrier order with the desired shipping carrier, requesting that the luggage asset be shipped in accordance with the shipping label data. The shipping carrier will then fulfill the shipping carrier order in delivering the luggage asset from the origination location address to the receiving location address. For example, the shipping carrier may dispatch a courier/driver to pickup the luggage asset at the origination location address. The courier/driver may scan a bar code on the digital shipping label displayed on the luggage asset. With many shipping carriers, bar code scanning automatically updates the carrier data system. The luggage asset may be scanned, and therefore tracked, at various other points along the shipping route (e.g. at distribution centers, upon delivery to the receiving location address, etc.). The central processing system may use this information to log route and in-transit location data, and notify the customer as needed (e.g. via SMS/text or email). For example, if any issues arise with the delivery (e.g. delays, errors) or when delivery has been completed. Ideally, the luggage asset is delivered to the customer receiving location at the receiving location address (by the receiving location date and at the designated time or timeframe, if any). The central processing system may receive order status notifications automatically from the shipping carrier system, or in response to order status requests made by the central processing system to the shipping carrier. The luggage asset may also continue to notify the central processing system of its current location and status information (e.g. in waiting to be picked up, during transit, etc.), which the central processing system can use to log route and in-transit location data, and to notify the customer as needed. Such luggage asset data may be used in conjunction or in lieu of carrier system data, particularly if the latter is unavailable. The luggage asset may loop through sleep/wake cycles to provide periodic status notifications. In a seventh step 714, the central processing system may confirm whether the luggage asset has been delivered to the receiving location address by the receiving location date. At that point the shipping carrier order is completed, although the customer order is still open.

Where carrier shipping rates are determined by package size, the luggage asset is preferably shipped from the origination location address to the receiving location address in a collapsed configuration. Once delivered to the receiving location address, the customer can switch the luggage asset from the collapsed configuration into an expanded configuration and then pack the contents to be shipped to the destination location address in the luggage asset. In this way, shipping cost savings may be realized between the origination location address and the receiving location address, compared to fixed volume packages or containers. Costs aside, a luggage asset in a collapsed configuration requires relatively less space than in an expanded configuration, which can itself be desirable where space is limited in transportation vessels (e.g. aircraft, trucks, etc.) or carrier facilities.

In an eighth step 716, once the luggage asset is delivered to the receiving location address, second shipping label data is generated for the next transportation leg of the luggage asset as in step 708. At this point, the customer order details may be either confirmed or updated with the central processing system. For example, the customer may want to cancel the customer order, meaning the luggage asset will not be continuing to the destination location address. In that case, the now-available luggage asset may be returned to a dispatch center or assigned to a new customer order (with the receiving location address being the origination location address for the new customer order), as determined by the central processing system. Or, the customer may want to change or add to the customer order details. For example, change the pickup location address to something other than the receiving location address (e.g. from a home address to a work address) or instead elect to drop off the luggage asset at a shipping carrier store in person, change the pickup location date, change the destination location address, and/or change the destination location date. The central processing system may receive modified order details from internal or external data entry. For example, the customer could call customer service and an agent updates the order details in the system. Or, the customer could use a front-end web application to submit updated order details. Or, the customer could use a smartphone application in proximity to the luggage asset to update the label data (e.g. via NFC), and the luggage asset notifies the central processing system of the updated order details. If no modifications are made, the luggage asset may simply be delivered from the receiving location address to the destination location address as designated in the original customer order. As in step 706, the central processing system may again determine the route/carrier in response to order modification(s) or reevaluate its previous route/carrier determinations even if no modification(s) are made, for example, to ensure those determinations are still valid in view of the current carrier/route data. In a ninth step 718, the second shipping label data is transferred to the luggage asset as in step 710. Thus, steps 716, 718 may differ from steps 708, 710 in that a customer smartphone application may generate shipping label data (e.g. by modifying order details) and transfer the data directly from the smartphone to the programmable label of the luggage asset in some embodiments, without the central processing system as an intermediary. In such embodiments, it is preferable that system security measures for authorization/verification are in place to ensure that change requests are being made by the correct customer (see description below in reference to FIG. 8 for further details). It should be appreciated that in other embodiments, customers may not be authorized to unilaterally modify shipping label data (e.g. customer modification requests must be processed by the central processing system).

In a tenth step 720, the central processing system creates a second shipping carrier order for the luggage asset from the generated second shipping label data and requests the selected shipping carrier fulfill of the shipping carrier order (or the customer may request fulfillment, for example, if the customer modifies the label data and drops the luggage asset off at a shipping carrier store). The customer then makes the luggage asset available for pickup by the shipping carrier at the designated pickup location on the pickup date (or courier service as described below), or drops off the luggage asset at a carrier store, which in either case alerts the central processing system that the luggage asset is in transit as discussed above in step 712. The shipping carrier will then fulfill the shipping carrier order in delivering the luggage asset from the pickup location address to the destination location address. In an eleventh step 722, the central processing system may confirm whether the luggage asset has been delivered to the destination location address by the destination location date. At that point, the second carrier order is completed, while the customer order may also be complete or still open.

In a twelfth step 724, once the luggage asset is delivered to the destination location address, third shipping label data is generated for the next transportation leg of the luggage asset as in step 708, 716. Customer order details may be either confirmed or updated with the central processing system as discussed above in step 716. If the destination location is the terminal location of the customer order, then the customer order is complete; the customer's belongings are unpacked and collapsed luggage asset will be picked up and shipped to another location determined by the central processing system. This location may be a luggage asset storage/distribution/holding center of the system, where the unassigned luggage asset is then available for assignment to a new customer order and deployment, or a receiving location address for a different customer order assigned to the luggage asset by the central processing system (see step 706 above). In the latter case, the destination location address for the first customer order is also the origination location address for the new customer order. Or, the unpacked and collapsed luggage asset may remain at the destination location address for further assignment (e.g. if the destination location address is a third-party system participant, such as a partner hotel or resort, which will act as a temporary storage center until the luggage asset receives a new assignment by the central processing system, thereby eliminating the shipping leg between the destination location address and a system dispatch center). Alternatively, the luggage asset could continue on with the original customer to a second or subsequent destination address, in which case the second pickup location address may be the first destination address or another address indicated by the customer, or the customer may elect to drop off the luggage asset at a carrier store, as discussed above in step 708. This second destination address may be the first receiving or pickup location address (e.g. if the customer is returning home from a vacation), or an entirely new location address (e.g. if the customer is traveling between multiple locales on vacation). In any event, same steps described above are performed in delivering the luggage asset to the second destination address or any further destination address, until a terminal location of the customer order is reached.

Figure 8:
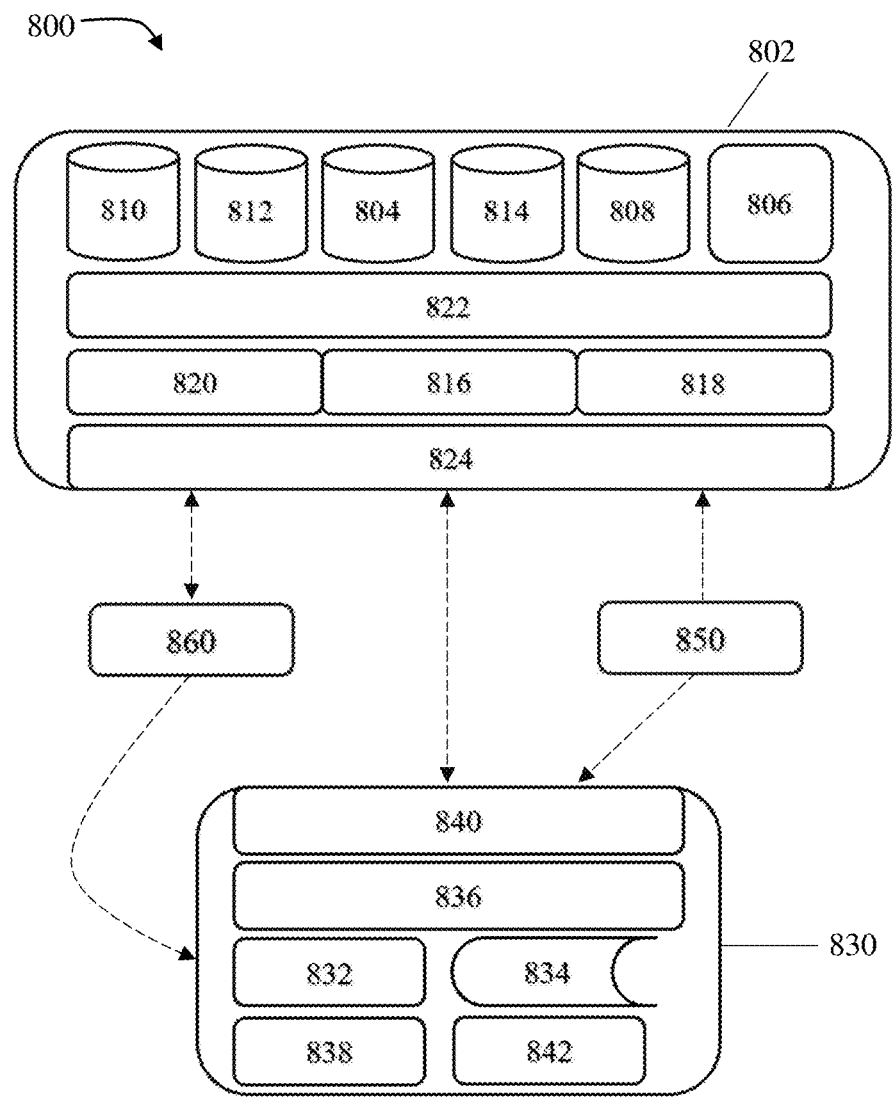
FIG. 8 shows a schematic diagram of an on-demand shared luggage system according to the present disclosure.

FIG. 8 depicts a schematic diagram of an embodiment of a system 800 according to the present disclosure. The system 800 comprises a central processing system 802, a plurality of luggage assets 830, user peripheral devices 850, and a shipping carrier system 860. The central processing system 802 performs many of the key tasks of shipping methods disclosed herein with respect to order processing and order fulfillment. The central processing system 802 may be cloud-based in some embodiments. The central processing system 802 includes a luggage asset database 804, which maintains a current location and status of all luggage assets 830 in system inventory for reference by a logistics analytics engine 806. The central processing system 802 includes a customer database 808, which maintains customer account information (e.g. name, address, email, phone, stored payment method, billing address, etc.). The central processing system 802 includes an order database 810, which maintains information regarding specific customer orders (e.g. a request from a customer to ship a particularly-sized luggage asset from a first address to a second address by a certain date). The order database 810 also contains information regarding carrier orders (outgoing to shipping carriers) to fulfill customer orders (incoming from customers). In this sense, the order database 810 may be said to comprise two linked data sets (a customer order and its corresponding carrier order), which may alternatively be characterized as separate customer order and carrier order databases. The central processing system includes a carrier database 812, which maintains information regarding shipping carrier service providers (e.g. rates, capabilities, capacities, routes, availability, etc.). The central processing system includes a route database 814, which maintains information regarding specific routes (e.g. logged transit time between locations). In general terms, route data comprises any information affecting transit between two points, and is discussed in more detail below with respect to the logistics analytics engine 806.

The logistics analytics engine 806 references the data described above to determine when, where, and how luggage assets 830 are deployed. The logistics analytics engine 806 determines the route, carrier and luggage asset to fulfill a customer order. For example, the logistics analytics engine 806 references customer order information in the order database 810 for the order requirement parameters. The logistics analytics engine 806 references the luggage asset location and availability data from the luggage asset database 804 to identify luggage assets 830 that are currently available to fulfill the subject customer order (e.g. idle in a storage/dispatch/distribution center) or will be available to fulfill the subject customer order (e.g. currently assigned to another customer order, but can be re-routed upon completion thereof) within the order requirement parameters. One factor in the determination is the geographic proximity of a given luggage asset 830 to the requested receiving location, since distance can affect shipping cost (depending on the carrier). Generally, the risk that a delivery will not arrive by the requested date increases with travel distance, and relatedly, time in transit. Available dates, routes, and carriers, competing customer orders, geographic asset distribution, costs and weather may all be considered, whether for an initial deployment or for each subsequent leg of an ongoing customer order. In the depicted embodiment, the logistics analytics engine 806 comprises programming languages (e.g. Python, R, C++), frameworks and libraries configured on scalable multi-processor cloud-based systems with direct access databases and large in-memory data sets for analysis and fast query/response.

In some embodiments, the logistics analytics engine 806 uses artificial intelligence/machine learning tools to improve delivery effectiveness over time. Effectiveness here may be in terms of resource efficiency (e.g. selecting the most cost-effective luggage assets, carriers and routes), fulfillment efficiency (e.g. improve probability that customer order parameters will be met successfully), or a combination thereof depending on the desired optimization. The central processing system 802 collects and stores real-world data with each logistics leg between an origination location and destination location and way-points therebetween. Historical data may be collected at carrier receiving and distribution centers, when the luggage asset 830 is sorted, transferred or transported, whether by persons, robots, or conveyor systems. Seasonal factors such as weather and holidays may be incorporated, based on historical performance data. For example, if a previous shipment between New York and Colorado traversing U.S. Interstate 70 (I-70) by truck in the month of February was delayed two days due to a snowstorm, compared to another previous shipment along the same route in normal weather in July, the logistics analytics engine 806 will be able to take this information into account in determining the selected route for the same or similar shipments in the future. The logistics analytics engine 806 may elect an air shipping class instead of ground shipping class (if a two-day delay would violate the order requirement parameters). Likewise, the logistics analytics engine 806 may incorporate historical weather data (e.g. high incidence of snowstorms in February along I-70) and/or real-time weather data (e.g. no snowstorms present or forecasted along I-70 during the shipping timeframe) in determining whether to re-route the luggage asset. In the same way, historical data regarding shipping delays during holidays or other high-volume periods may also be tracked and used to determine which luggage asset, carrier and/or route to assign to a particular customer order. The predictive modeling and decision-making by the logistics analytics engine 806 will therefore improve over time as the performance of customer orders provides additional datasets to the central processing system 802.

The central processing system 802 includes a luggage asset middleware module 816, a front end module 818, and application programming interface (API) module 820, which provides an interface between the central processing system 802 and a shipping carrier system 860. The luggage asset middleware module 816 provides an interface between the central processing system 802 and the luggage asset 830. The luggage asset middleware module 816 sends information to the luggage asset 830 (e.g. digital label data) and receives information from the luggage asset 830 (e.g. status and location) in managing the luggage asset database 804. The front end module 818 provides an interface between the central processing system 802 and user peripheral devices 850. The front end module 818 manages static and dynamic information presented to a customer or potential customer via user peripheral devices 850, and receives information input by a customer or potential customer via user peripheral devices 850. The front end module 818 may be an interactive web application, for example. The API module 820 provides an interface between the central processing system 802 and a shipping carrier system 860. The API module 820 sends requests to and receives responses from the shipping carrier system 860 regarding shipping order status. For example, the API module 820 may actively inquire about the current estimated delivery time and date of a luggage asset 830. Or, the API module 820 may also passively receive notifications automatically generated by the shipping carrier system 860.

The central processing system 802 also comprises a back end data processing system 822, which directs communications between the various modules/databases and coordinates system actions of the central processing system 802. For example, if the front end module 818 receives a user quote request for specific dates with origin and destination details, then the back end data processing system 822 queries route and carrier data for the requested dates/locations and cross-references pricing based on shipping class and fixed business rules (e.g. "express" delivery if seeking next day delivery) to provide a price quote to the customer.

The central processing system 802 also comprises a communication security layer 824 which authenticates interactions between the central processing system 802 and the luggage assets 830, peripheral devices 850, and carrier systems 860. Communications may be secured and encrypted using SSL and IPv6 protocols, or any other suitable security measures. For example, SSH/sFTP (secure file transfer protocol) may be used for the integration of data between the luggage asset 830 and the luggage asset middleware 816 and database 804. HTTPs and SSL may be used for protecting sensitive customer data (e.g. credit card information) during order entry from a peripheral device 850 to the front end module 818.

The luggage asset 830, which is one of a plurality of luggage assets in system inventory, includes a digital label display 832. The digital label display 832 displays digital label data (e.g. customer name, destination address, route tracking number/identifier, etc.) for a given shipping leg of the customer shipping order. For example, the digital label display 832 may show the customer's name and requested receiving location address when the luggage asset is first shipped from the origination location address to a customer according to a customer order (e.g. when a collapsible luggage asset is empty in a collapsed configuration). Or the digital label display 832 may show the destination location address if shipped from the receiving or drop-off location address (e.g. when the collapsible luggage asset is packed with the customer's belongings in an expanded configuration). The label format of the digital label display 832 may vary with the selected shipping carrier for that shipping leg. For example, the arrangement, type of information, and route tracking number or identifier (e.g. a barcode or other scannable object) may all be configured to work with the given shipping carrier system 860. In this way, the dynamic display of the digital label display 832 permits the luggage asset 830 to be used with different shipping carriers and carrier systems as needed. The digital label data is preferably, but not necessarily, stored on a non-volatile memory 834 of the luggage asset 830. The non-volatile memory 834 ensures the digital label data is maintained even when the luggage asset 830 is powered off (e.g. during a sleep cycle). In some embodiments, the digital label display 832 may further be a currentless display, meaning the power is only required to "set" the displayed digital label data but not to continue displaying the same label data until it is modified. The luggage asset 830 also comprises a controller 836 which processes incoming data signals from the central processing system 802 and/or peripheral devices 850, and controls the activity of the luggage asset components in response to those data signals. The controller 836 may also be programmed to control the activity of the luggage asset components without external data signal input (e.g. manage sleep/wake cycles, generate location/status notifications to the central processing system 802, etc.). In embodiments where the luggage asset 830 includes independent location-tracking functionality, the luggage asset 830 has a location-tracking device 838, such as a GPS system. For communication with the central processing system 802 and peripheral devices 850, the luggage asset 830 one or more communication systems 840. The communication system 840 may include transmitter/receiver device(s) for data transmission via RFIC/RFID, LPWA/cellular, Bluetooth, NFC, etc. For example, in communicating with the central processing system 802, the communication system 840 may use Low Power Wide Area (LPWA) cellular network or LoRaWAN (long range wide area network) transmission. However, any suitable IoT (Internet of Things) protocols may be used. For example, in communicating with a peripheral device 850 like a smartphone, the communication system 840 may use short-range protocols like NFC (near field communication) or Bluetooth. This gives customers the ability to update the digital label data as needed (e.g. to make a last-minute modification to the destination address). Security measures for central processing system communications are discussed above with respect to the communication security layer 824 of the central processing system 802. For the security of communication with peripheral devices 850, the luggage asset 830 may be loaded with a security token or unique identifier with the initial customer order assignment, which is linked to the customer account for the customer order, so that only the authorized customer is able to modify digital label data for the assigned luggage asset 830 using his or her smartphone application upon verification by the security token or unique identifier. In further embodiments, the security token and smartphone application configuration may be used to control access to interior of the luggage asset 830 using a physical smart lock 842, which will only unlock if the authorized customer's smartphone is in close proximity to it or alternatively if the authorized customer toggles an unlock/lock command through the smartphone application. Blockchain technology may incorporated into the system 100 to provide a reliable audit trail of each transaction of the luggage asset 830 through the logistics network.

The peripheral device 850 corresponds to a user interface device, such as a smartphone (app), computer (website browser), or smart home device (e.g. Amazon Alexa or Google Home). Communications between the central processing system 802 and the peripheral device 850 may be Internet-based via wired, Wi-Fi, or cellular network connection, for example. As discussed above, certain peripheral devices 850 like a smartphone using a smartphone application may be able to interact directly with the luggage asset 830 (e.g. programmable label verification/authentication). Smartphone peripheral devices 830 may also be used in the delivery process (e.g. digital label scans by on-demand courier service providers).

The shipping carrier system 850 may be a third-party delivery service provider system. The shipping carrier system 850 receives order requests from the central processing system 802 and typically logs information during order fulfillment. For example, a shipping carrier may scan a shipping label barcode displayed on the digital label display 832 when the luggage asset 830 is picked up, dropped off, and/or processed at waypoints (e.g. by an automated conveyor scanner at a carrier sorting and distribution center). The central processing system 802 may use this data to track the status of the luggage asset 830 and/or provide notifications to the customer. The central processing system 802 may request status data (e.g. via the API module 820) or the shipping carrier system 850 may automatically provide the data.

It should also be appreciated that shipping fulfillment need not be performed by a third-party shipping carrier service provider. In other words, the shipping carrier function may be fully integrated into the system (a single-party system). In that case, a customer order and a shipping order may comprise one and the same order in the system. Likewise, the carrier system may be fully integrated with the central processing system. In that case, external API queries and replies are not necessary.

Although the above-described systems and methods largely discuss order fulfillment between two locations (origination and destination) by a single shipping carrier, some embodiments may utilize more than one carrier/courier service to accomplish this task. While large shipping carriers generally have the system infrastructure required to efficiently fulfill long-distance orders (e.g. long-haul trucking and aircraft fleets, automated sorting at high capacity distribution hubs, etc.), their end-to-end delivery options may be restricted. For example, some shipping carriers may not perform pickups or deliveries on Sundays. However, customer travel schedules and shipping requirements are not so limited. Further, sometimes shipping carriers do not offer or cannot perform direct door-to-door delivery in certain circumstances. For example, a shipping carrier may only leave a package delivery with a hotel front desk or concierge, even if the customer requests delivery to a particular room or suite. This can be especially inconvenient to customers in the case of resorts where the main office is not in close proximity or otherwise easily accessible to individual villas, cottages or the like, or where the main office has limited hours and therefore may not be open when a carrier goes to drop off a package or a customer goes to pickup a package (e.g. self-service style rentals with remote booking and key lockboxes for onsite access upon arrival). Further, many lodging accommodations establishments prefer to not accept delivery and hold customer packages for liability reasons, and some may even have a policy against doing so.

Figure 9:
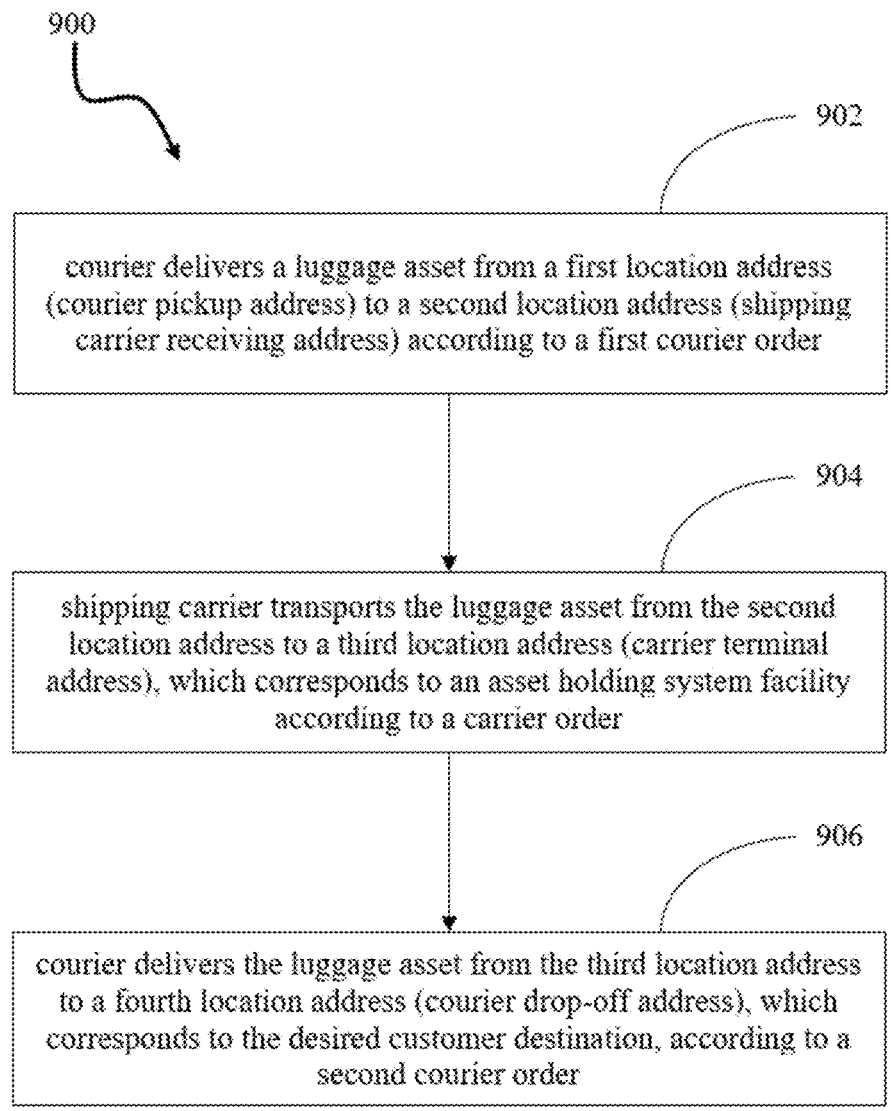
FIG. 9 shows a schematic flowchart for a further embodiment of a method according to the present disclosure.

Referring now to FIG. 9, an embodiment of a shipping method 900 according to the present disclosure in illustrated. The method 900 depicts a single leg of a customer order with partial courier fulfillment. Although the method 900 is generally described in terms of the leg between the customer's origination location and destination location, the method 900 may be used in any leg of a customer order. In a first step 902, a courier delivers a luggage asset from a courier pickup address to a carrier receiving address according to a courier order, and transfers custody of the luggage asset to a shipping carrier, thereby completing the courier order. The courier pickup address may be a luggage asset's origination location address, customer receiving location address, pickup location address, or customer destination location address, as described above. The carrier receiving address may be a shipping carrier store or other carrier drop-off center, for example. In a second step 904, the shipping carrier transports the luggage asset to a carrier terminal address according to a carrier order. For example, the carrier terminal address may be a luggage asset storage/distribution/holding facility of a system according to the present disclosure. In a third step 906, a courier delivers the luggage asset from the carrier terminal address to a courier drop-off address, which corresponds to the customer's desired delivery address, according to a courier order. If the luggage asset arrives at the carrier terminal address before the customer needs or wants the luggage asset (e.g. the customer has not arrived in town yet and is not expected for several days), the luggage asset will remain at the asset storage/distribution/holding system facility until the customer is ready to receive the luggage asset at the customer's desired delivery address, at which point a courier will deliver the luggage asset to the customer's desired delivery address. The central processing system confirm with the customer whether to deliver the luggage asset, before requesting delivery by the courier and releasing the luggage asset. It should be appreciated that the designated asset storage/distribution/holding system facility is preferably the close in proximity to the customer's desired delivery address. As distance therebetween increases, the central processing system may determine that courier service between available storage/distribution/holding system facilities and the customer's desired delivery address is not economically or logistically efficient, in selecting how a customer order will be fulfilled. Therefore, door-to-door courier service integration may not be available for all customer orders, and in those cases, the shipping carrier handles the initial luggage asset pickup and final delivery according to the carrier order. Likewise, some customer orders may include the first step 902 but not the third step 906, or vice versa. This may also vary between different legs of the same customer order.

The method 900 can be carried out according to the systems and methods already described. For example, the central processing system may determine which combination of assets, routes, couriers, carriers, etc. have the highest chance of successful fulfillment or the highest margin of cost savings (or any combination thereof) using logistics analytics. The central processing system will generate a courier order and request fulfillment by the selected courier. The central processing system may send requests to and receive responses from the courier system regarding order status and notify the customer of the same as needed. Courier, courier route, and courier order data is collected by the central processing system for future reference. Courier systems are incorporated into the shipping system in the same manner as carrier systems. Digital label data displayed on the luggage asset display can be formatted for a given courier system.

Substantial benefits may be realized from dividing out end-to-end transit between shipping carriers and delivery couriers. Large shipping carriers can benefit by avoiding variable terminus address logistical issues, while playing to their strengths of system infrastructure well-equipped for efficient long-distance transport between distribution hubs. Simplification of shipping carrier orders may result in reduced shipping carrier rates incurred by a system according to the present disclosure. Delivery couriers receive additional orders. Customers have more front- and back-end flexibility in shipping luggage assets. On-demand peer delivery service providers have become increasingly prevalent in recent years, which may offer on-demand order fulfillment capabilities, customizable order options (e.g. more precise delivery timeframes, specific delivery instructions, etc.), and real-time delivery status tracking (e.g. courier location and expected time of arrival). A customer also may also take satisfaction knowing that the luggage asset containing his or her belongings is secured at an asset storage/distribution/holding system facility, with final delivery postponed until he or she is ready to receive the luggage asset, rather than awaiting pickup in a busy hotel or resort. And customer satisfaction, in turn, benefits the shipping system according to the present disclosure with an increased likelihood of earning customer loyalty, recommendations, and future orders.

It should be appreciated that courier fulfillment, as with shipping carrier fulfillment, need not be performed by a third-party courier service provider. In other words, the courier function may be fully integrated into the system (a single-party system).

Figure 10A:
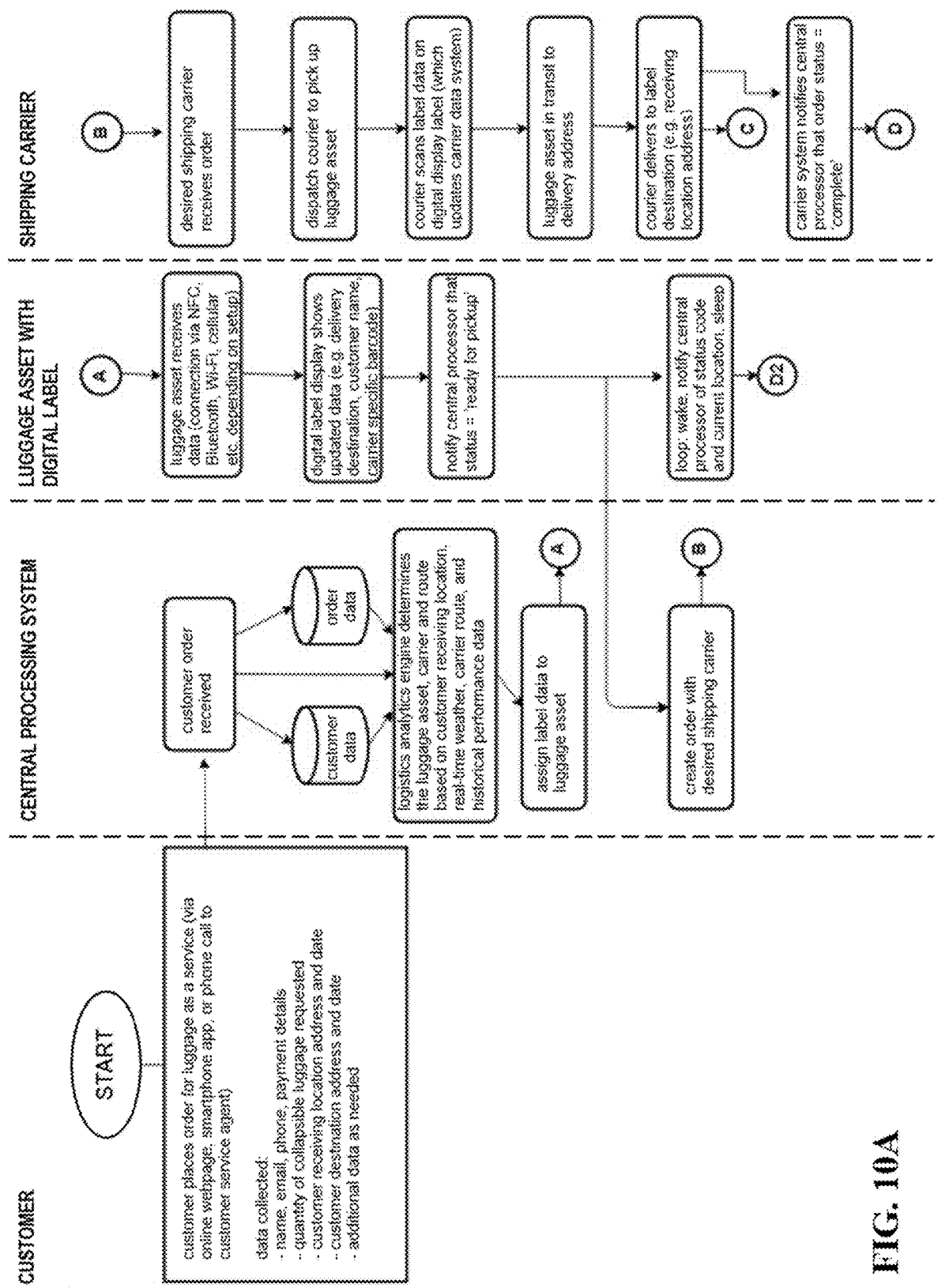
FIG. 10 shows a schematic flowchart for an on-demand shared luggage method according to present disclosure, with the individual views of FIGS. 10A-10C together comprising the single view of FIG. 10.
Figure 10B:
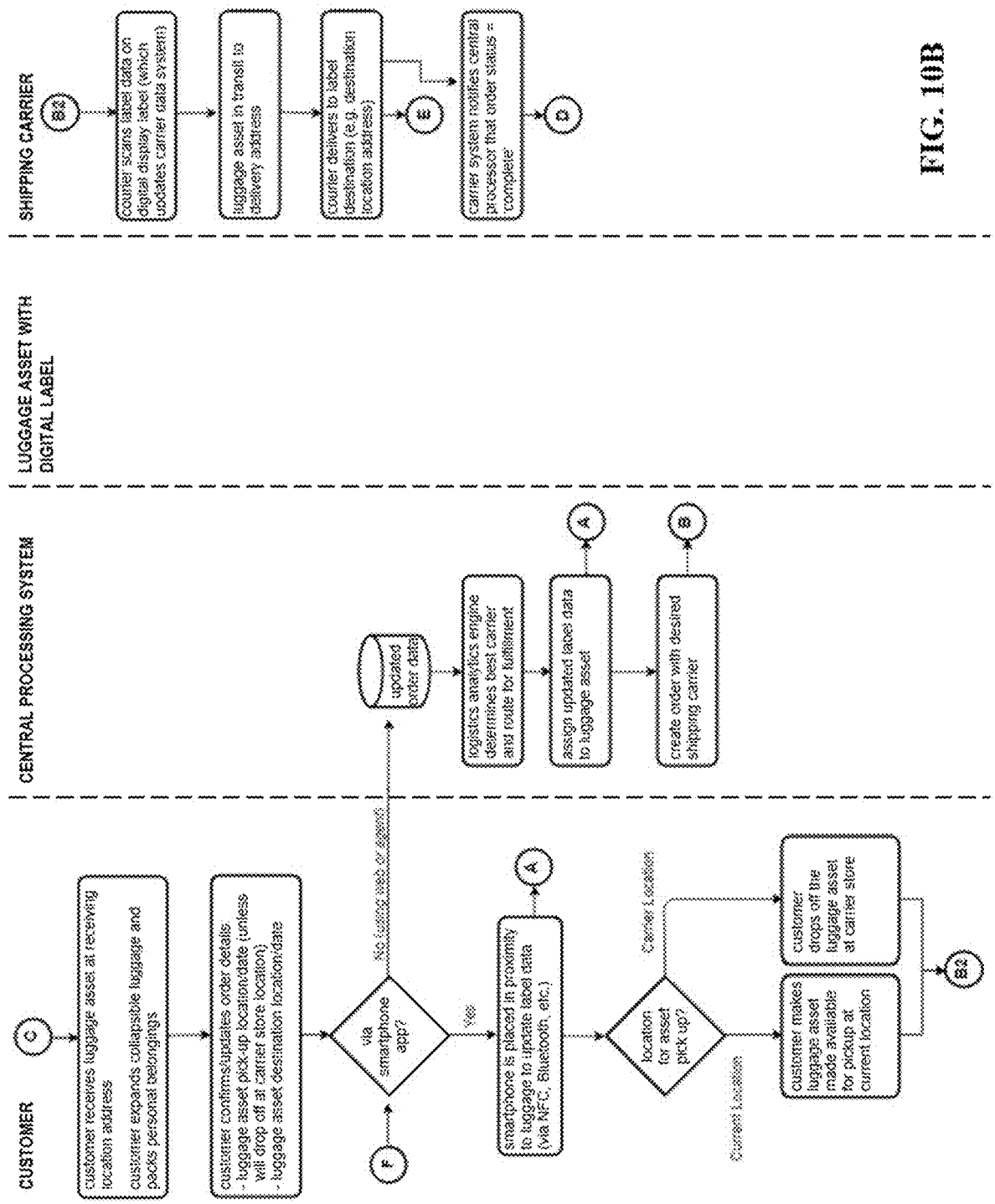
Figure 10C:
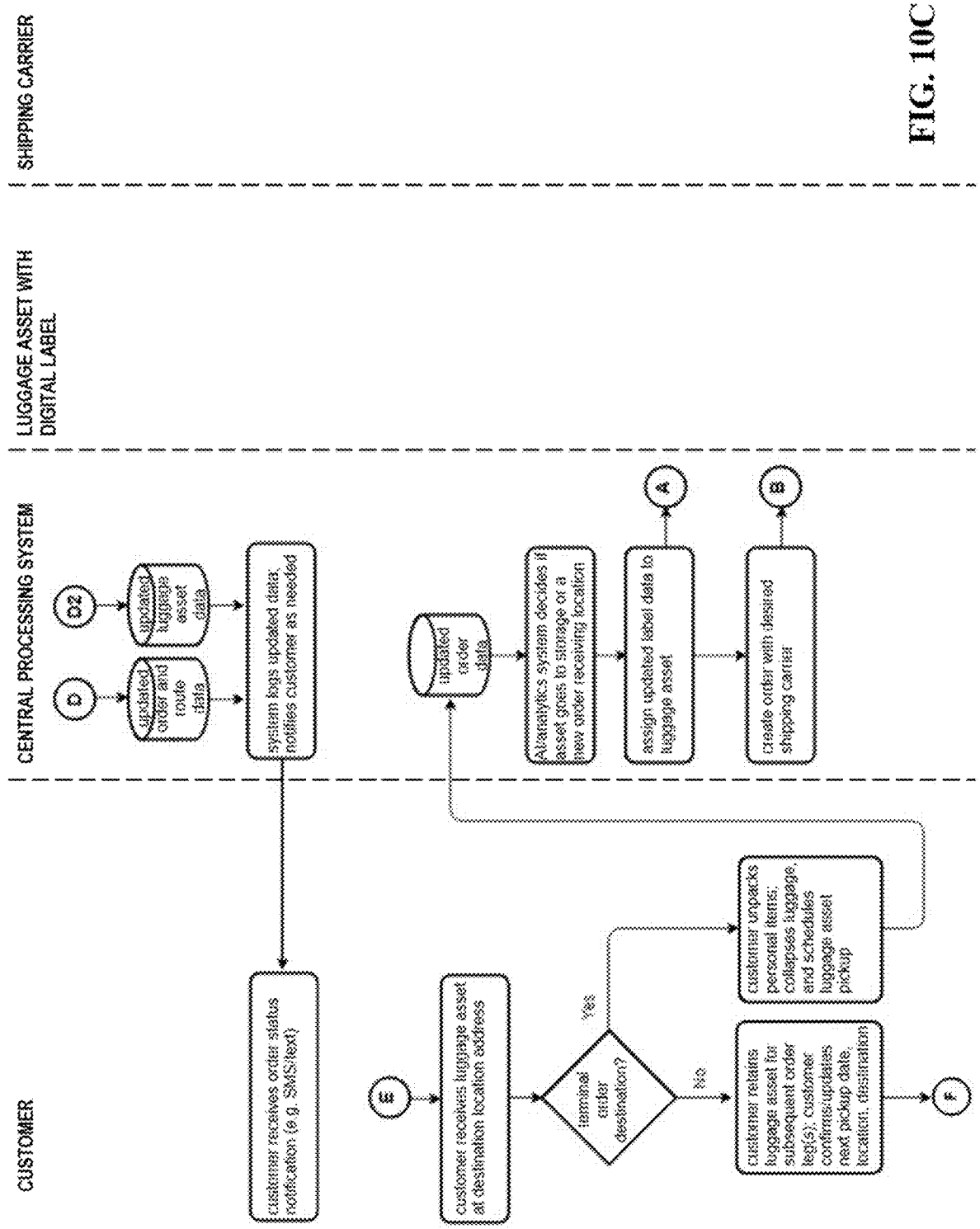

FIG. 10, which is formed by the views of FIGS. 10A, 10B, and 10C for purposes of readability, shows a schematic flowchart for an embodiment of a method according to the present disclosure. Letters enclosed by circles indicate the relationships between the three views of the flowchart. The method of FIG. 10 may be carried out according to the systems and methods already described herein.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

The invention claimed is:

1. An on-demand shared luggage method comprising the steps of:

receiving a customer order to deliver a piece of luggage to a first location address by a first location receiving date and then deliver the piece of luggage to a second location address by a second location delivery date;

processing the customer order to determine order parameters for the customer order, the order parameters comprising at least the first location address, the first location receiving date, the second location address, and the second location delivery date;

determining, by a central processing system referencing at least luggage asset location data and luggage asset availability data maintained by the central processing system, which luggage asset(s) from a plurality of luggage assets can fulfill the customer order in accordance with the order parameters, and selecting one of the available luggage asset(s) to fulfill the customer order;

generating first shipping label data to ship the selected luggage asset from a third location address to the first location address, the third location address being a location of the selected luggage asset;

transferring the first shipping label data to the selected luggage asset, the selected luggage asset having a programmable label display, whereby the first shipping label data is displayed on the programmable label display of the selected luggage asset;

requesting, via the central processing system, that the selected luggage asset be shipped in accordance with the first shipping label data;

confirming that the selected luggage asset arrives at the first location address by the first location receiving date;

generating second shipping label data to ship the selected luggage asset from the first location address to the second location address;

transferring the second shipping label data to the selected luggage asset, whereby the second shipping label data replaces the first shipping label data and is displayed on the programmable label display of the selected luggage asset;

requesting, via the central processing system, that the selected luggage asset be shipped in accordance with the second shipping label data; and confirming that the selected luggage asset arrives at the second location address by the second location receiving date;

wherein the selected luggage asset is interchangeable between a collapsed configuration and an expanded configuration, the collapsed configuration occupying a smaller volume than the expanded configuration;

wherein the selected luggage asset is shipped empty from the third location address to the first location address in the collapsed configuration; and wherein the selected luggage asset is shipped with a customer's belongings from the first location address to the second location address in the expanded configuration.

2. The method of claim 1, further comprising the steps of:

generating third shipping label data to ship the selected luggage asset from the second location address to a fourth location address;

transferring the third shipping label data to the selected luggage asset, whereby the third shipping label data replaces the second shipping label data and is displayed on the programmable label display of the selected luggage asset; and requesting, via the central processing system, that the selected luggage asset be shipped in accordance with the third shipping label data.

3. The method of claim 2, wherein the fourth location address is a luggage asset distribution center, a subsequent destination for the customer order, or a luggage asset receiving location for a new customer order assigned to the selected luggage asset by the central processing system.

4. The method of claim 1, wherein the central processing system further references route data and carrier data maintained by the central processing system in the step of determining which luggage asset(s) from a plurality of luggage assets can fulfill the customer order in accordance with the order parameters and selecting one of the available luggage asset(s) to fulfill the customer order.

5. The method of claim 4, wherein route data comprises historical route performance data and real-time weather data.

6. The method of claim 1, wherein the central processing system collects data during fulfillment of the customer order for use in future customer orders.

7. The method of claim 1, wherein the central processing system is cloud-based.

8. An on-demand shared luggage system comprising:

a central processing system, the central processing system comprises a plurality of databases, a logistics analytics engine, a luggage asset middleware module, an application programming interface (API) module, and a front end module, wherein the plurality of databases includes at least luggage asset data, order data, carrier data, and route data;

a plurality of luggage assets, each luggage asset comprises a body, a programmable label display, a non-volatile memory, a controller, and a communication system, wherein the body of the luggage asset is configured to interchange between a collapsed configuration and an expanded configuration, the collapsed configuration occupying a smaller volume than the expanded configuration, and the programmable label display is configured to display shipping label data, the shipping label data stored on the non-volatile memory;

a peripheral device which provides an interface for a user to submit a customer order to the central processing system, the peripheral device communicatively connected to the front end module of the central processing system, wherein the customer order comprises asset receiving location data, asset destination location data, and asset delivery date data; and a shipping carrier system which receives carrier order data generated by the central processing system and transmits shipping status data to the central processing system, wherein the shipping carrier system is communicatively connected to the API module of the central processing system, and the shipping carrier system comprises shipping label data readers which generate the shipping status data from the shipping label data displayed on the luggage asset during fulfillment of the carrier order;

wherein the central processing system, via the logistics analytics engine, is configured to reference the luggage asset data, the order data, the carrier data, the route data, the asset receiving location data, the asset destination location data, and the asset delivery date data in assigning at least one of the luggage assets to the customer order and in generating the carrier order data and the shipping label data for the customer order;

wherein the communication system of the luggage asset is communicatively connected to the luggage asset middleware module of the central processing system, and configured to receive the shipping label data generated by the central processing system.

9. The system of claim 8, wherein the front end module of the central processing system is communicatively connected to the peripheral device, and configured to transmit the shipping status data received by the central processing system from the shipping carrier system to the peripheral device via order status notifications.

10. The system of claim 8, wherein the peripheral device is a smartphone including a smartphone application linked to the customer order, and the communication system of the luggage asset is communicatively connected to the smartphone application.

11. The system of claim 10, wherein the communication system of the luggage asset is communicatively connected to the smartphone using near field communication (NFC) or other shortrange wireless communication protocols.

12. The system of claim 10, wherein the smartphone application linked to the customer order is authorized to modify shipping label data on the luggage asset.

13. The system of claim 10, wherein the luggage asset further comprises a smart lock which restricts access to an interior of the luggage asset, and the smart lock is controllable via the smartphone application linked to the customer order.

14. The system of claim 8, wherein the central processing system stores historical performance data collected from previous customer orders in the plurality of databases, and the logistics analytics engine references the historical performance data for future customer orders.

15. The system of claim 8, wherein the central processing system is cloud-based.

16. The system of claim 8, wherein the body of the luggage asset is formed by two opposing face panels and four sides disposed between the two face panels, the four sides include two opposing longitudinal sides and two opposing lateral sides; wherein each lateral side comprises a displaceable lateral side panel which is pivotably attached to one of the two face panels; wherein the lateral side panels are perpendicular to the face panels when the body is in the extended configuration and parallel to the face panels when the body is in the collapsed configuration; wherein each longitudinal side comprises a fold line, and the longitudinal sides are configured to fold inwards toward one another when the body is changed from the expanded configuration to the collapsed configuration.

* * * * *